Nov. 13, 1962     C. A. TUZZALINO     3,063,440
CARBURATOR, CONDENSER AND DRAIN
Filed July 10, 1961

Inventor
Costenzio Tuzzalino
By Neil E. Hamilton
Attorney

United States Patent Office 3,063,440
Patented Nov. 13, 1962

3,063,440
CARBURATOR, CONDENSER AND DRAIN
Costenzio A. Tuzzalino, Hillside, Ill.
(782 Cedar Ave., Elmhurst, Ill.)
Filed July 10, 1961, Ser. No. 123,407
9 Claims. (Cl. 123—198)

This invention is in the field of internal combustion engine improvements. In particular, this invention relates to a condenser and drain assembly for a carburator air filter housing.

A notorious problem in the automotive field is the increased oil consumption in older automobiles. Another disadvantage of older automobiles is the contamination of the oil that occurs as well as the loss thereof. This contamination results from mixture of the lubricating oils with the burnt residue of the gas mixture or from contacting imperfectly combustible gas mixtures. An additional deleterious effect is the general reduction of engine efficiency from accumulation of carbon gums and cakes in the cylinder wall on the piston head.

This increased oil consumption occurs in older engines because of the worn rings surrounding the piston head. Since the lubricating oil in the crankcase is always under some pressured gradient, the lubricating oil is forced up between the piston head and the cylinder wall past the formerly tight fitting rings into the compression chamber from whence they are exhausted through the outlet valve into the exhaust system of the automobile. In copending application Serial No. 53,511, filed September 1, 1960, an apparatus and means was provided to meet the high oil consumption in older automobiles. The apparatus and method comprised a conduit which communicated with the interior of the crankcase and the interior of the carburator or air filter element to provide a continuous system which was partially closed. This system was employed to reduce the differential in pressure between the crankcase and the atmosphere. Although the apparatus and method is highly effective in decreasing oil consumption, the arrangement on occasion causes the internal combustion engine to flood because of water condensation in the carburator air filter housing. This problem particularly occurs at colder outside temperatures. It was found that one of the products of gaseous combustion in the engine that bypassed the piston rings was water vapor, and such water vapor was routed to the carburator air filter by the conduit arrangement. At lower temperatures this vapor condensed in the carburator air filter housing and choked off the atmospheric air which is normally drawn into the filter. The accumulation of water caused the engine to flood because of the presence of the water itself and because the fuel-air mixture was too high on the fuel side.

It is a primary object of this invention to provide an improved carburator-conduit system for older internal combustion engines.

It is another object of this invention to provide a water condenser and drain system in air housing of a carburator to permit efficient operation and usefulness of a conduit attachment between the air filter and the crankcase.

And still another object of this invention is to provide an inexpensive accessory unit for a carburator air filter housing whereby water vapor may be condensed and effectively removed.

A still further object of my invention is to provide a condenser and drain system whereby water vapor as a combustion by-product does not flood an internal combustion engine.

The foregoing objects and other objects which will be apparent from the following disclosure are now accomplished by the present invention which is described in detail in the following description and illustrated in the attached drawing wherein.

Figures 1, 2:
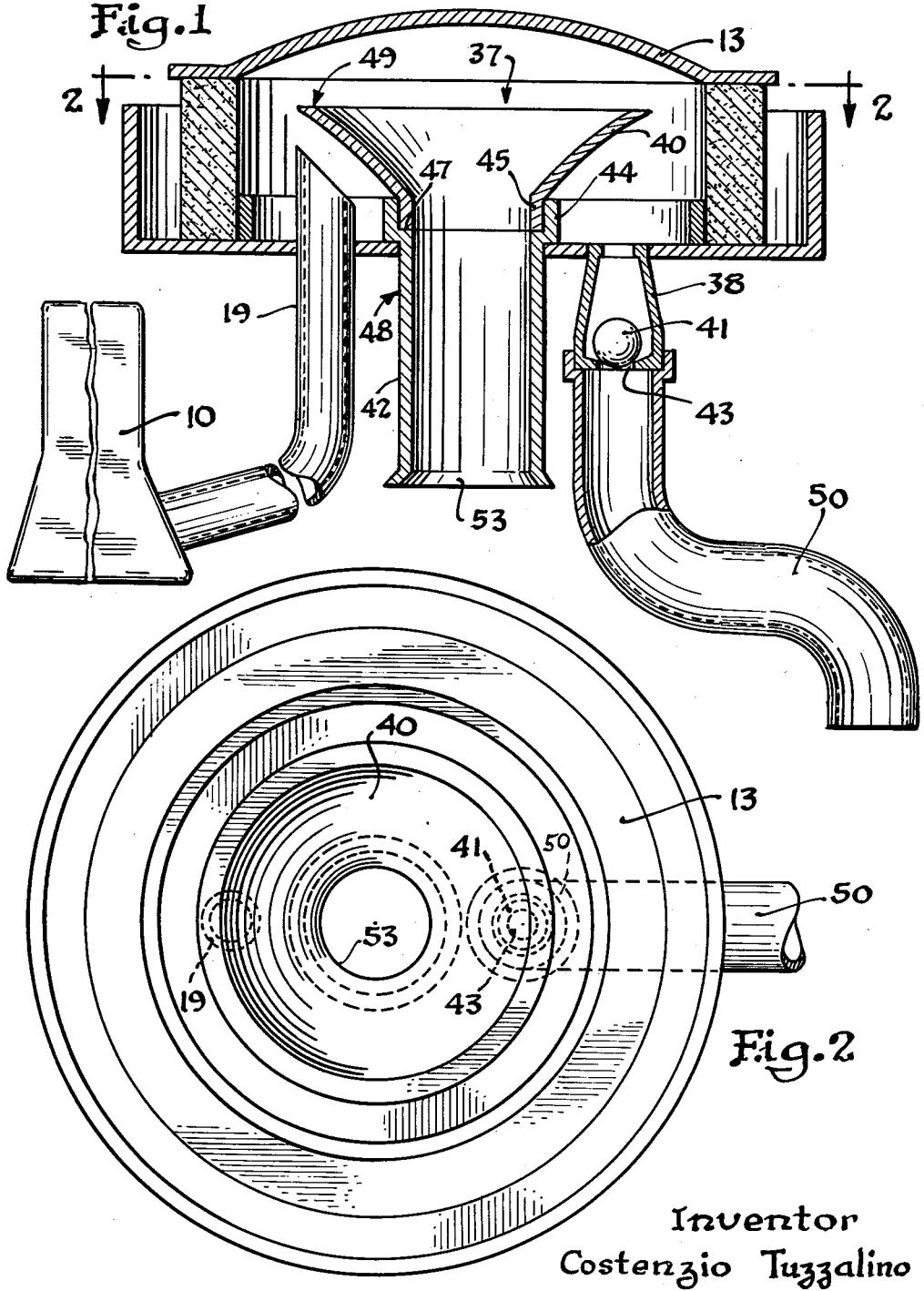
FIGURE 1 is a side elevation view in cross section of an air filter housing with the water condenser and drain systems.
FIGURE 2 is a top plan view of the air filter housing taken along lines 2, 2' of FIGURE 1.

The problem of high oil consumption in worn internal combustion engines was solved by a system (not shown) wherein a closed conduit was provided to connect the crankcase and the carburator air filter housing. This provided a continuous system between compression chamber, crankcase, air filter housing, carburator and intake manifold.

Once the rings around a piston are worn down from their original form and shape, the pressure in the crankcase forces the lubricating oil in ever increasing amounts into the compression chamber. This untoward effect is countered by altering the gradient pressures so that the internal combustion engine can operate but without serious loss of lubricating oil. To achieve this end, the oil filler sealing cap is removed from the original oil filler inlet and the lower end of a conduit is secured thereto. The upper and terminating portion of the conduit is then placed in communication with the interior of the carburator air filter housing at a point intermediate the maze of the air filter housing and the carburator air inlet housing.

The water vapor which is a by-product of combustion passes through the conduit system to the carburator air filter housing where it condenses, particularly in low temperatures to cause the engine to be choked off. This disadvantage is now circumvented by the condenser and drain assembly of the present invention.

In FIGURE 1, condenser 37 is seen as a body with side walls defining a central passageway open at both ends. The condenser 37 is shown seated within the carburator air filter housing 13. It is adjacent the terminal of the conduit 19 which empties the water vapor into the air filter housing 13 by being connected to crankcase 10. The condenser 37 is shown in the form of a cone which has a continuous flaring side wall 40 reaching throughout most of the enclosed area within the air filter housing 13. Flaring side walls in a form other than a cone would serve in an equivalent manner. The flaring continuous side wall 40 reduces to a generally vertical continuous side wall 42. The vertical continuous side walls 42 terminate in an opening 53 which is adapted for close fit into the air inlet housing leading to a carburator and an intake manifold (not shown).

The condenser 37 can be constructed from a wide variety of materials because the operability of the condenser depends on the presence of the side walls and the general upward and outward flaring configuration rather than any particular material. Certain materials which enhance condensation of hot gases are, of course, preferred such as high heat conductive metals. The condenser 37 operates by a temperature differential on the inside and the outside of the side walls. The hot water vapor which empties from the conduit 19 into the air filter 13 strikes the flared continuous walls 40 of the condenser 37. The temperature on the outside of such walls is, accordingly, high. Atmospheric air is drawn through the air filter housing 13 within the interior of the condenser 37 striking the interior of the flared walls 40 and the vertical walls 42. The temperature on the interior of the condenser is, accordingly, low. This differential in temperatures on the outside and inside of the condenser causes the hot water vapor to condense to liquid droplets on the surface of the flared wall 40.

The collected liquid water is removed from the air filter housing 13 by means of a drain arrangement communicating with the interior of the air filter housing 13.

The drain unit consists of a drain valve 38 communicating with the interior of the air filter housing 13 at its upper end and its lower end enclosed by an end wall which is interrupted by an outlet port 43. Within the drain valve 38 is a ball check or float 41 which operates to allow collected liquid water to pass out of the drain valve 38 into the affixed drain pipe 50 from whence it is externally discarded.

The ball check or float 41 is constructed of any material that has a density lower than water so that the accumulated liquid water in the drain valve 38 causes the ball float 41 to rise and open the outlet port 43 whereby the liquid water passes out of the drain valve 38 into the drain pipe 50. It will be apparent to the skilled men in the art that equivalent drain valves and drain outlets can be placed in conjunction with the condenser of the carburator air filter housing 13.

The condenser 37 can be constructed of integral side wall or it can be constructed of multiple parts to facilitate insertion and removal. The embodiment of FIGURE 1 shows a two-part condenser system consisting of an upper portion generally shown as 49 which has its continuous flared wall 40 terminating in a short vertical continuous wall 45. This short continuous vertical wall 45 is seated in close relationship on an annular abutment 47 within vertical side walls of extended diameter 44. The lower portion generally designated as 48 can be seated in an opening in the bottom of the air filter housing 13 and the upper portion 49 can be fitted therein. The open bottom of the lower portion 48 is adapted for close fit onto the carburator air inlet housing (not shown).

It is, of course, understood that condenser units of various dimensions can be prepared to closely fit air filter housings of various construction in size and shape. Likewise, drain valves of various diameters can be provided to seat with various air filter housings having various dimensions, shapes and sizes.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. In an internal combustion engine having a closed conduit joining the crankcase and the carburator air filter housing to provide a continuous system, a water condenser and drain assembly disposed in said carburator air filter housing which comprises: a condenser body having side walls and a central passageway open at both ends, the upper portion of the condenser body placed in the interior of the air filter housing, the lower portion outside said air filter housing, the side walls of the upper portion flaring, the terminal of the conduit in the air filter housing adjacent the flaring side walls, and means to drain away the condensed water vapor.

2. The condenser of claim 1 further characterized in that the flaring walls are conical in shape.

3. The structure of claim 1 further characterized in that the upper portion of the condenser is separately mounted on the lower portion thereof.

4. The condenser and drain assembly of claim 1 further characterized in that the drain means consists of a drain valve communicating with the interior of the air filter housing and having a port which is stoppered by a float with a density less than water.

5. A condenser and drain assembly for an internal combustion engine which comprises in combination: a carburator air filter housing, a conduit originating from the crankcase and terminating with the air filter housing, a condenser body having side walls to define a central passageway open at both ends, the upper portion of the condenser present within the air filter housing and the lower portion outside said housing, the open end of the lower portion adapted for seating engagement onto a carburator air inlet housing, the walls of the upper portion flaring, the conduit terminal located adjacent the flaring walls to empty water vapor against the flaring walls, and drain means on the floor of the housing to remove the condensed water vapor.

6. The combination of claim 5 further characterized in that the flaring walls are conical in shape.

7. The combination of claim 5 further characterized in that the upper portion of the condenser is separately mounted in the lower portion.

8. The combination of claim 5 further characterized in that the drain means is a valve communicating with the interior of the air inlet housing and having a port which is stoppered by a float with a density lighter than water.

9. A condenser and drain assembly for an internal combustion engine which comprises in combination: a carburator air filter housing, a conduit originating from the crankcase and terminating within the air filter housing, a condenser body having side walls to define a central passageway open at both ends, the upper portion of the condenser having continuous conical side walls reaching throughout most of the enclosed area within the air filter housing, the terminal of the conduit adjacent said conical walls, the lower portion extending below said air filter housing with its open end adapted for seating engagement onto a carburator air inlet housing, and a drain valve communicating with the interior of the air filter housing having a port stoppered by a float with a density less than water whereby condensed water vapor passes through the port and out of the air filter housing.

References Cited in the file of this patent

UNITED STATES PATENTS

| | | |
|---|---|---|
| 2,113,407 | Hardinge | Apr. 5, 1938 |
| 2,118,633 | White | May 24, 1938 |
| 2,652,819 | Nusbaum | Sept. 22, 1953 |
| 2,731,958 | Robley | Jan. 24, 1956 |